US010090516B2

(12) United States Patent
Balaya et al.

(10) Patent No.: US 10,090,516 B2
(45) Date of Patent: Oct. 2, 2018

(54) ELECTRODE MATERIAL AND METHOD OF SYNTHESIZING

(71) Applicant: NATIONAL UNIVERSITY OF SINGAPORE, Singapore (SG)

(72) Inventors: Palani Balaya, Singapore (SG); Saravanan Kuppan, Singapore (SG); Bing Liu, Singapore (SG); Chad William Mason, Fessenden, ND (US)

(73) Assignee: National University of Singapore, Singapore (SG)

( * ) Notice: Subject to any disclaimer, the term of this patent is extended or adjusted under 35 U.S.C. 154(b) by 263 days.

(21) Appl. No.: 14/395,921

(22) PCT Filed: Apr. 23, 2013

(86) PCT No.: PCT/SG2013/000164
§ 371 (c)(1),
(2) Date: Oct. 21, 2014

(87) PCT Pub. No.: WO2013/162473
PCT Pub. Date: Oct. 31, 2013

(65) Prior Publication Data
US 2015/0132640 A1     May 14, 2015

Related U.S. Application Data

(60) Provisional application No. 61/637,347, filed on Apr. 24, 2012.

(51) Int. Cl.
*H01M 4/04* (2006.01)
*H01M 4/36* (2006.01)
(Continued)

(52) U.S. Cl.
CPC ......... *H01M 4/364* (2013.01); *H01M 4/0471* (2013.01); *H01M 4/133* (2013.01);
(Continued)

(58) Field of Classification Search
None
See application file for complete search history.

(56) References Cited

U.S. PATENT DOCUMENTS

| | | |
|---|---|---|
| 5,872,074 A | 2/1999 | Schulz et al. |
| 2007/0160519 A1 | 7/2007 | Barker et al. |

(Continued)

FOREIGN PATENT DOCUMENTS

| | | |
|---|---|---|
| CN | 1681145 A | 10/2005 |
| WO | WO 2008/141422 A1 | 11/2008 |

OTHER PUBLICATIONS

Meligrana et al. Journal of Power Sources 160 (2006) 516-522.*
(Continued)

*Primary Examiner* — Wojciech Haske
(74) *Attorney, Agent, or Firm* — Hamilton, Brook, Smith & Reynolds, P.C.

(57) ABSTRACT

The present disclosure provides a phosphate framework electrode material for sodium ion battery and a method for synthesizing such electrode material. A surfactant and precursors including a sodium precursor, a phosphate precursor, a transition metal precursor are dissolved in a solvent and stirred for sufficient mixing and reaction. The precursors are reacted to yield a precipitate of particles of $Na_xA_bM_y(PO_4)_zX_n$ compound and with the surfactant attached to the particles. The solvent is then removed and the remaining precipitate is sintered to crystallize the particles. During sintering, the surfactant is decomposed to form a carbon network between the crystallized particles and the crystallized particles and the carbon matrix are integrated to form the electrode material.

12 Claims, 12 Drawing Sheets

(51) Int. Cl.
| | |
|---|---|
| H01M 4/136 | (2010.01) |
| H01M 4/54 | (2006.01) |
| H01M 4/58 | (2010.01) |
| H01M 10/054 | (2010.01) |
| H01M 4/133 | (2010.01) |
| H01M 4/587 | (2010.01) |
| H01M 4/60 | (2006.01) |
| H01M 4/62 | (2006.01) |
| H01M 4/1397 | (2010.01) |

(52) U.S. Cl.
CPC .......... H01M 4/136 (2013.01); H01M 4/366 (2013.01); H01M 4/54 (2013.01); H01M 4/587 (2013.01); H01M 4/5825 (2013.01); H01M 4/60 (2013.01); H01M 4/625 (2013.01); H01M 10/054 (2013.01); H01M 4/1397 (2013.01)

(56) References Cited

U.S. PATENT DOCUMENTS

| | | | |
|---|---|---|---|
| 2008/0138710 A1 | 6/2008 | Lia et al. | |
| 2008/0241043 A1 | 10/2008 | Barker et al. | |
| 2008/0308773 A1 | 12/2008 | Lia et al. | |
| 2010/0233074 A1* | 9/2010 | Song | C01B 13/366 423/606 |
| 2010/0323231 A1* | 12/2010 | Sakai | C01B 25/37 429/144 |
| 2011/0086266 A1 | 4/2011 | Kondo | |
| 2011/0269022 A1 | 11/2011 | Kawakami et al. | |
| 2012/0064397 A1 | 3/2012 | Kallfass et al. | |

OTHER PUBLICATIONS

Yang et al. Electrochem. Comm. 3 (2001) 505-508.*
Lide, D. R., ed. (2005). CRC Handbook of Chemistry and Physics(86th ed.). Boca Raton (FL): CRC Press. ISBN 0/8493-0486-5.*
Borong Wu, Yonghuan Ren and Ning Li (2011). LiFePO4 Cathode Material, Electric Vehicles â∈ The Benefits and Barriers, Dr. Seref Soylu (Ed.), ISBN: 978-953-307-287-6.*
International Search Report issued in International Application No. PCT/SG2013/000164, entitled "Electrode Material and Method of Synthesizing," dated Jul. 15, 2013.
Written Opinion issued in International Application No. PCT/SG2013/000164, entitled "Electrode Material and Method of Synthesizing," dated Jul. 15, 2013.
Santos-Peña, J., et al., "Carbon and Transition Metal Containing Titanium Phosphates as Electrodes for Lithium Ion Batteries", *Solid State Ionics*, 177:2667-2674 (2006).
Yuan, W., et al., "Synthesis of $Li_3V_2(PO_4)3$ Cathode Material Via a Fast Sol-Gel Method Based on Spontaneous Chemical Reactions", *Journal of Power Sources*, 201:301-306 (2012).
Extended European Search Report for European Patent Application No. 13781503, "Electrode Material and Method of Synthesizing", dated Jan. 8, 2016.
Notification Concerning Transmittal of Copy of International Preliminary Report on Patentability for International Application No. PCT/SG2013/000164 "Electrod Material and Method of Synthesizing"; dated Nov. 6, 2014.
Hepbasli, A., "A key review on exergetic analysis and assessment of renewable energy resources for a sustainable future", *Renewable & Sustainable Energy Review*, 12, 593-661 (2008).
Hepbasli, A., et al., "Development of geothermal energy utilization in Turkey: a review", *Renewable & Sustainable Energy Reviews*, 8, 433-460 (2004).
Hepbasli, A., "A review on the development of wind energy in Turkey", *Renewable & Sustainable Energy Reviews*, 8, 257-276 (2004).
Jian, Z., et al., "Carbon coated Na3V2(PO4) as novel electrode material for sodium ion batteries", *Electrochem. Commun.* 14, 86-89 (2012).
Plashinitsa, L.S. et al., "Performance of NASICON Symmetric Cell with Ionic Liquid Electrolyte", *Electrochem. Soc.* 157(4), A536-A543 (2010).
Gaubicher, J., et al., "Rhombohedral Form of $Li_3V_2(PO_4)_3$ as a Cathode in Li-Ion Batteries", *Chemistry of Materials*, 12, 3240-3242 (2000).
B.L. Cushing, et al., "$Li_2NaV_2(PO_4)_3$: A 3.7 Lithium-Insertion Cathode with the Rhombohedral NASICON Structure", *Journal of Solid State Chemistry*,162, 176-181 (2001).
T. Jiang, et al., Preparation and electrochemical studies of $Li_3V_2(PO_4)_3$/Cu Composite cathode material for lithium ion batteries *Journal of Alloys and Compounds*, 488, L26-L29 (2009).
Morgan, D., et al., "Experimental and Computational Study of the Structure and Electrochemical Properties of $Li_xM_2(PO_4)_3$ Compounds with the Monoclinic and Rhombohedral Structure", *Chemistry of Materials*, 14, 4684-4693 (2002).
Sarayanan, K. et al. "The First Report on Excellent Cycling Stability and Superior Rate Capability of $Na_3V_2(PO_4)_3$ for Sodium Ion Batteries." Adv. Energy Mater. 2013, 3, 444-450.
Hwang et al.; "Sodium-ion batteries: present and future;" Chem. Soc. Rev. The Royal Society of Chemistry (2017), DOI: 10.1039/c6cs00776g; 86 pages.
Kubota et al.; "Review—Practical Issues and Future Perspective for Na-Ion Batteries;" Journal of The Electrochemical Society, 162 (14) A2538-A2550 (2015).
Ong et al.; "Voltage, stability and diffusion barrier differences between sodium-ion and lithium-ion intercalation materials;" Energy Environ. Sci., (2011), 4, pp. 3680-3688.
Yabuuchi et al.; "Research Development on Sodium-Ion Batteries;" Chem. Rev. (2014); 114: pp. 11636-11682.

* cited by examiner

ELECTRODE MATERIAL AND METHOD OF SYNTHESIZING

This application is the U.S. National Stage of International Application No. PCT/SG2013/000164, filed Apr. 23, 2013, which designates the U.S., published in English, and claims the benefit of U.S. Provisional Application No. 61/637,347, filed Apr. 24, 2012.

TECHNICAL FIELD

The present disclosure relates to an electrode material for use in rechargeable batteries. In particular, the present disclosure relates to a phosphate framework electrode material for use in rechargeable sodium ion batteries and a method of synthesizing the phosphate framework electrode material.

BACKGROUND

Phosphate framework material possesses fairly well thermal stability and high voltage capabilities required for applications as electrodes e.g. anode or cathode in rechargeable sodium ion batteries. The major drawbacks which hinder the successful application of such type of material in commercial scale, however, lie in the poor electronic and ionic conductivity in its bulk form. Before such drawbacks are successfully overcome, this type of material may not be considered to be suitable for use in rechargeable sodium ion batteries. Attempts have been made to downsizing of the material to enhance the sodium intercalation/de-intercalation properties. However, downsizing will reduce the diffusion length for Na+–ions but may not effectively enhance the electron transportation to the current collector since particle-to-particle boundaries also increased with the downsizing, which can cause electron transportation to be sluggish. As a consequence, electronic conductivity may remain poor and the overall sodium-ion storage is limited.

It is therefore desirable to provide an electrode material having the necessary thermal stabilities and high voltage capacity as well as the electronic/ionic conductivities at a level acceptable for rechargeable sodium ion battery applications. Such a solution is currently not available.

SUMMARY OF THE DISCLOSURE

According to one aspect, embodiments of the present disclosure provide a phosphate framework material for use as electrode, e.g. anode or a cathode material, for use in rechargeable sodium ion batteries. The material comprises a compound according to the following formula:

$$Na_xA_bM_y(PO_4)_zX_n/C$$

where
$Na_xA_bM_y(PO_4)_zX_n$ denotes the structure of Na-transitional metal-Phosphate nanoparticles, in which,
  M is a transition metal obtained from a compound selected from a group consisting of metal acetates, metal nitrate metal chloride and metal acetyl acetonate;
  A is an additional doped or mixed cation(s) obtained from a compound selected from a group consisting of group 1 elements, transition metals, ammonium and hydrogen;
  X is a substituted anion or polyanion(s) obtained from a compound selected from a group consisting of fluorine, hydroxide, vanadate, arsenate, chloride, pyrophosphate;
  x, b, y, z and n denote the numbers of ions of a corresponding element, in which:
    $1 \leq x \leq 3$;
    $0 \leq b \leq 1$;
    $1 \leq y \leq 2$;
    $1 \leq z \leq 3$;
    $0 \leq n \leq 3$;
and
  C denotes a carbon content formed between the $Na_xA_bM_y(PO_4)_zX_n$ nanoparticles.

According to another aspect, embodiments of the present disclosure provide a method for synthesizing a phosphate framework electrode material. A surfactant and precursors including a sodium precursor, a phosphate precursor and a transition metal precursor are dissolved in a solvent, and maybe stirred for sufficient mixing and reaction. The precursors are reacted to yield a precipitate of particles of $Na_xC_bM_y(PO_4)_zX_n$ compound, and with the surfactant attached to the particles. The solvent is then removed and the remaining precipitate is dried and sintered to crystallize the particles. In the meantime, the surfactant remaining on the particles is decomposed to form a carbon network between the crystallized particles, and the crystallized particles and the carbon matrix are integrated to form the electrode material in bulk form.

Other aspects and advantages of the present disclosure will become apparent from the following detailed description, illustrating by way of example the inventive concept of the present disclosure.

BRIEF DESCRIPTION OF THE DRAWINGS

These and other aspects of the present disclosure will be described in detail with reference to the accompanying drawings, in which.

DETAILED DESCRIPTION OF PREFERRED EMBODIMENTS

Figure 1:
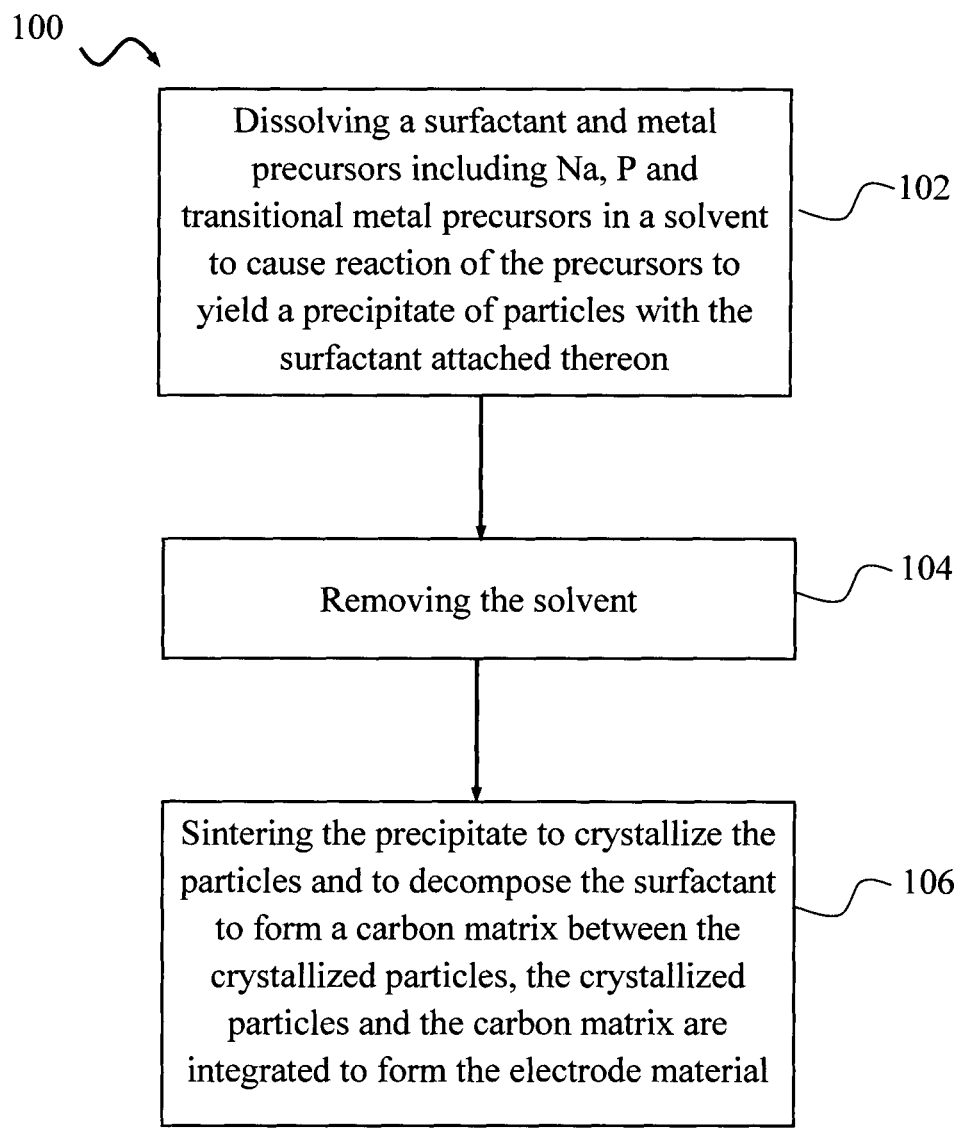
FIG. 1 is a block diagram showing a method of synthesizing an electrode material according to one embodiment of the present disclosure.

FIG. 1 illustrates a method 100 of synthesizing an electrode material according to one embodiment of the present disclosure. At block 102, a surfactant and metal precursors including a sodium precursor, a phosphate precursor and a transitional metal precursor are dissolved in a solvent to cause reaction of the precursors in the solvent. The solvent may be alcohol and/or a mixture of de-ionized water and alcohol. The mixture of the precursors may be stirred to help uniform mixing of the reactants at atomic level. The reaction yields a precipitate of amorphous sodium-transitional metal-phosphate compound particles with the surfactant attached thereto. At block 104, the solvent is removed and at block 106, the remaining precipitate is sintered, e.g. in a flowing, inert gas or a reducing atmosphere. During the sintering process, the surfactant remaining on the particles is decomposed to form an integrated conductive carbon matrix between the crystallized nanoparticles, and the crystallized nanoparticles and the carbon matrix are integrated to form the electrode material in bulk form.

The above method enables homogeneous mixing of the precursors and control of the particle size and morphology. The carbon matrix decomposed from the surfactant and formed between the nanoparticles prevents the particle agglomeration and growth during the sintering process. The carbon matrix also forms an in-situ coating of electrically conductive carbon layer on the crystallized nanoparticles. The carbon matrix therefore can greatly improve the electrical conductivity to make the electrode material suitable for rechargeable sodium ion battery applications.

The above method may be used to synthesize the entire phosphate polyanion family of electrode materials for the sodium ion battery applications. The base formula for these compounds takes the form of:

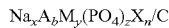

where

Na$_x$A$_b$M$_y$(PO$_4$)$_z$X$_n$ denotes the structure of Na-Transitional Metal-Phosphate nanoparticle, in which:
- M is a transition metal obtained from a compound selected from a group consisting of metal acetates, metal nitrate metal chloride and metal acetyl acetonate;
- A is an additional doped or mixed cation(s) obtained from a compound selected from a group consisting of group 1 elements, transition metals, ammonium and hydrogen;
- X is a substituted anion or polyanion(s) obtained from a compound selected from a group consisting of fluorine, hydroxide, vanadate, arsenate, chloride, pyrophosphate;
- x, b, y, z and n denote the numbers of ions of a corresponding element, in which:
  - $1 \leq x \leq 3$;
  - $0 \leq b \leq 1$;
  - $1 \leq y \leq 2$;
  - $1 \leq z \leq 3$;
  - $0 \leq n \leq 3$;

and

C denotes a carbon matrix formed between the Na$_x$A$_b$M$_y$(PO$_4$)$_z$X$_n$ nanoparticles.

The sodium precursor may be a sodium salt. The phosphate precursor may be an ammonium di-hydrogen phosphate or a phosphoric acid. The transitional metal precursor comprises a compound selected from the group consisting of metal acetates, metal nitrate, metal chloride, metal acetyl acetonate and metal hydroxide. The surfactant provides the necessary carbon content to form the carbon matrix during sintering to integrate with the crystallized nanoparticles. The surfactant comprises a compound selected from the group consisting of Sodium dodecyl sulfate (SDS), octyltrimethyl ammonium bromide (OTAB), dodecyltrimethyl ammonium bromide (DOTAB), cetyltrimethyl ammonium bromide (CTAB) and gluconic acid lactone.

Sample electrode material synthesized by the above method include, but not limited to, Na$_3$V$_2$(PO$_4$)$_3$/C, Na$_3$V$_2$(PO$_4$)$_2$F$_3$/C, Na$_2$FePO$_4$F/C, NaVPO$_4$F/C, Na$_2$FePO$_4$(OH)/C, Na$_2$Fe$_{0.5}$Mn$_{0.5}$PO$_4$F/C, Na$_2$Ti$_{0.5}$Mn$_{0.5}$PO$_4$F/C, Na$_2$V$_{0.5}$Mn$_{0.5}$PO$_4$F/C, NaFePO$_4$/C, Na$_3$Ti$_2$(PO$_4$)$_3$/C. These materials possess unique properties of small crystallite size, high purity, high crystallinity, large surface-to-volume ratio, and promising structural stability after prolonged charge-discharge cycles required to use in sodium ion rechargeable batteries.

Note that for materials containing additional cation, e.g. Fe in Na$_2$Fe$_{0.5}$Mn$_{0.5}$PO$_4$F/C, Ti in Na$_2$Ti$_{0.5}$Mn$_{0.5}$PO$_4$F/C and V in Na$_2$V$_{0.5}$Mn$_{0.5}$PO$_4$F/C and for those containing anion/polyanion e.g. F in Na$_3$V$_2$(PO$_4$)$_2$F$_3$/C, compounds or precursors containing the respective cation/anion are added and dissolved in the solvent for reaction together with the sodium precursor, phosphate precursor and transitional metal precursor.

The crystallized particles have a grain size between about 20 nm to 200 nm, and the carbon layer coated on the particles has a thickness of about 2 to 10 nm. The carbon matrix portion in the electrode material is not more than about 5% in weight, and forms a carbon coating layer covering the crystallized nanoparticles in a surface area of about 10 to 100 m$^2$/gram. Therefore, electrode materials provided by embodiments of the present disclosure have electrically conductive carbon matrix sufficiently mixed and integrated with the crystallized Na-transitional metal-Phosphate nanoparticles. The crystallized Na-transitional metal-Phosphate nanoparticles provide enhanced sodium intercalation/deintercalation. In the meantime, the interconnected carbon matrix between the nanoparticles provides electrical conductivity suitable for rechargeable sodium ion battery applications.

A Na$_3$V$_2$(PO$_4$)$_3$/C (NVP/C) material formed according to the above method is now taken as a non-limiting example to illustrate the characteristics and performances for use as electrode in rechargeable sodium ion batteries. It should be appreciated that other types of phosphate framework material synthesized by the method according to embodiments of the present disclosure may be taken for performance study in a similar manner.

FIGS. 2 to 5 show test results of structural characterization study and morphological analysis of NVP/C material synthesized according to an embodiment of the present disclosure.

Figure 2:
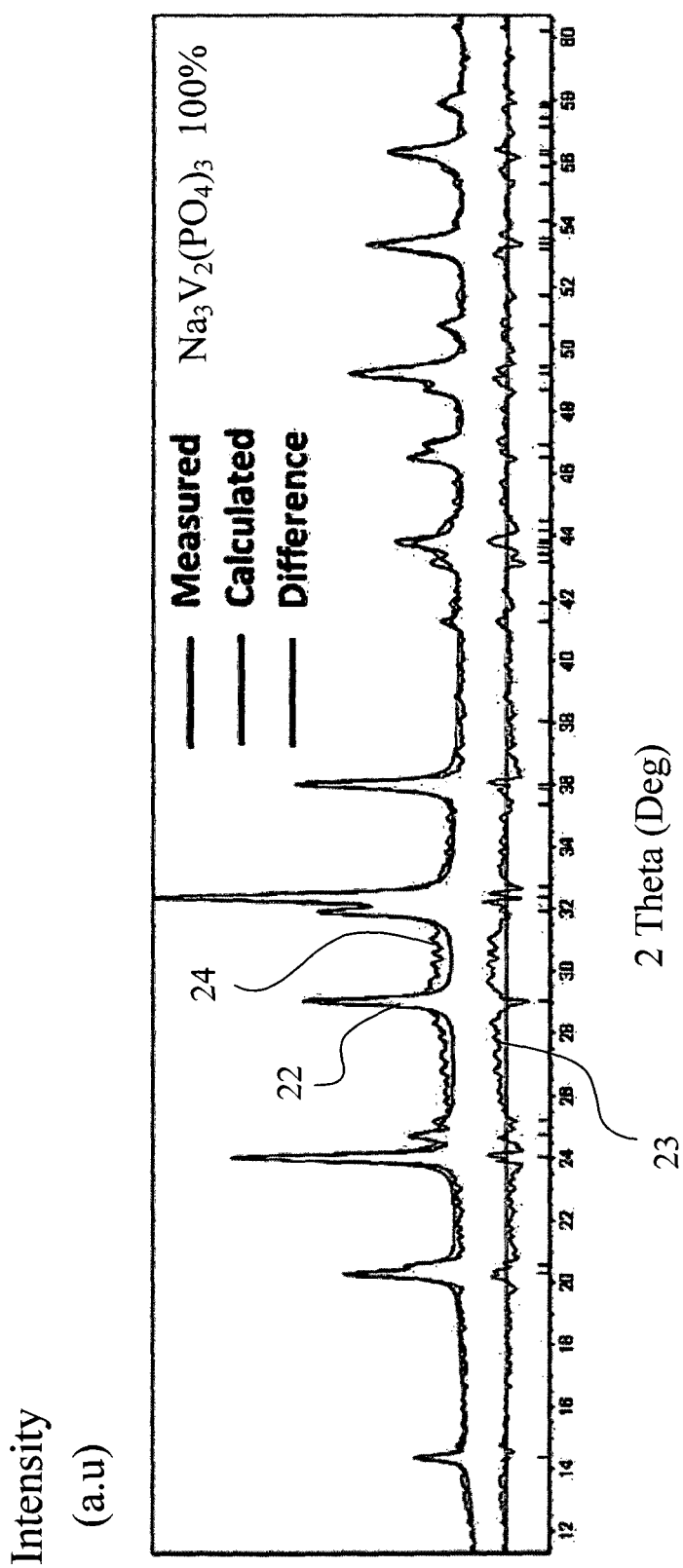
FIG. 2 is a chart showing a Rietveld refinement pattern of X-ray diffraction data of a $Na_3V_2(PO_4)_3/C$ sample synthesized as an electrode material according to one embodiment of the present disclosure.

FIG. 2 depicts a powder X-ray diffraction pattern (PXRD) of a porous NVP/C electrode material sample. Rietveld refinement of the PXRD pattern is performed to show the pure phase formation of NVP/C, without any impurity. This characteristic is evidenced by the close match of the calculated/fitted curve 22 and measured curve 24 and the difference 23 of curves 22 and 24.

Figure 3A:
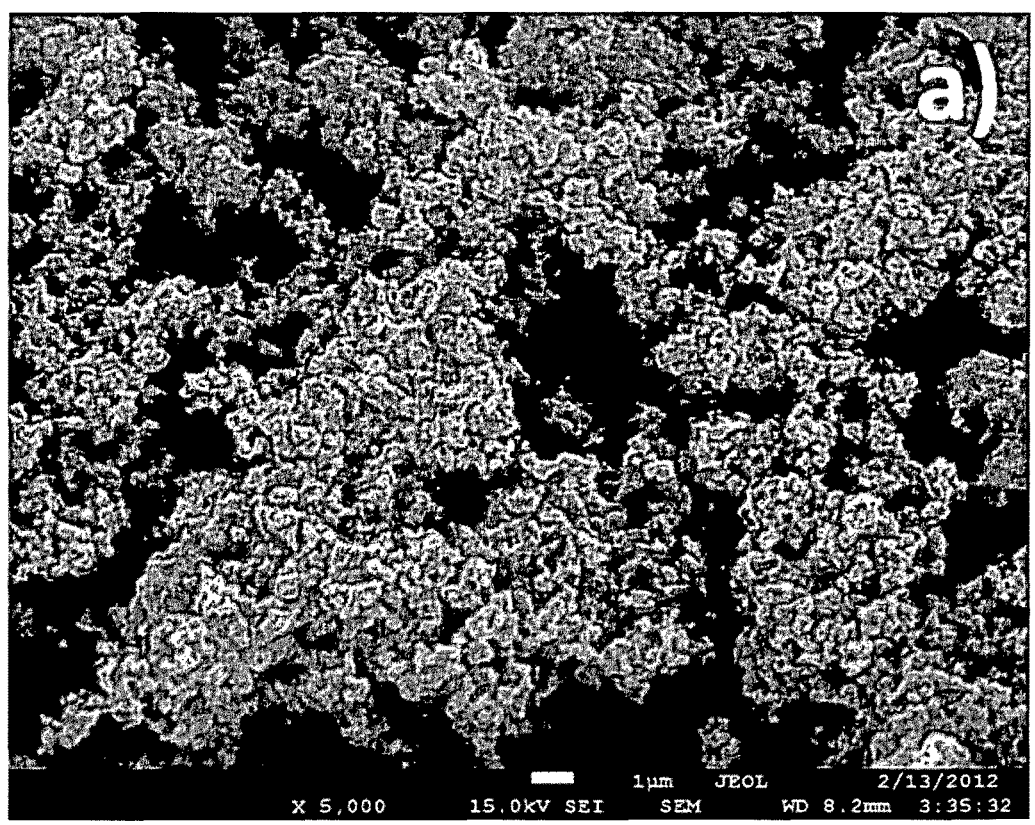
FIG. 3A is an FESEM image of a $Na_3V_2(PO_4)_3/C$ sample synthesized using C16 surfactant.
Figure 3B:
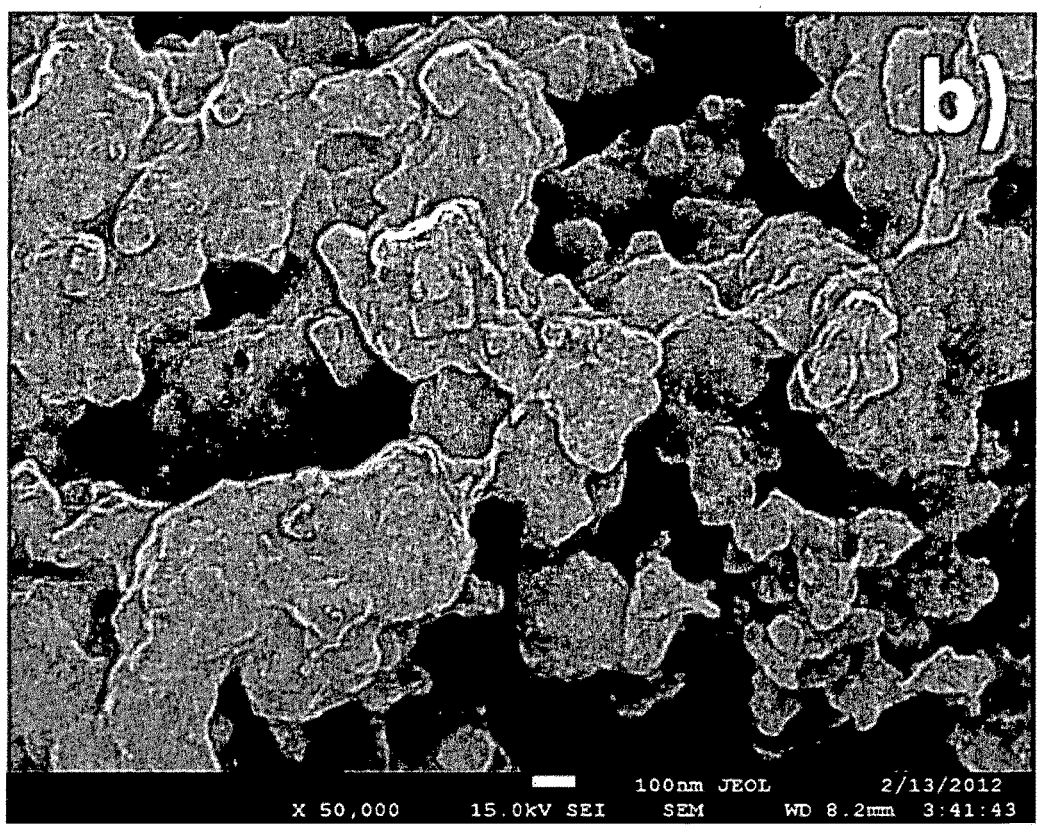
FIG. 3B is an enlarged view of FIG. 3A

FIGS. 3A and 3B are field emission scanning electron microscope (FESEM) images of NVP/C sample, showing a network of NVP particles with an irregular morphology and various sized ranging from 500 to 900 nm. Transmission Electron Microscopy (TEM) analysis reveals that the NVP nano grains are well dispersed in the carbon matrix.

Figure 4A:
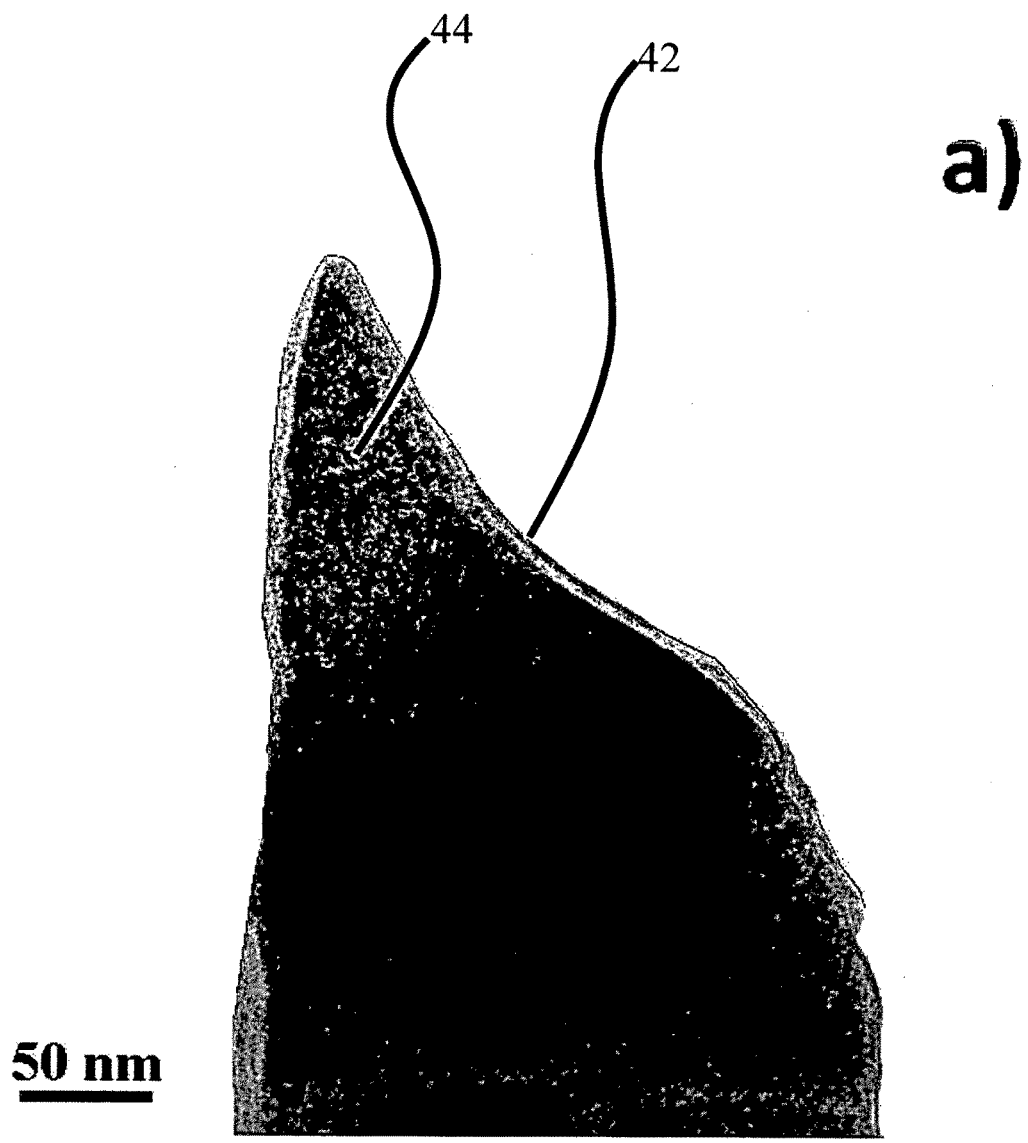
FIG. 4A is a TEM image of a mesoporous $Na_3V_2(PO_4)_3/C$ particle.
Figure 4B:
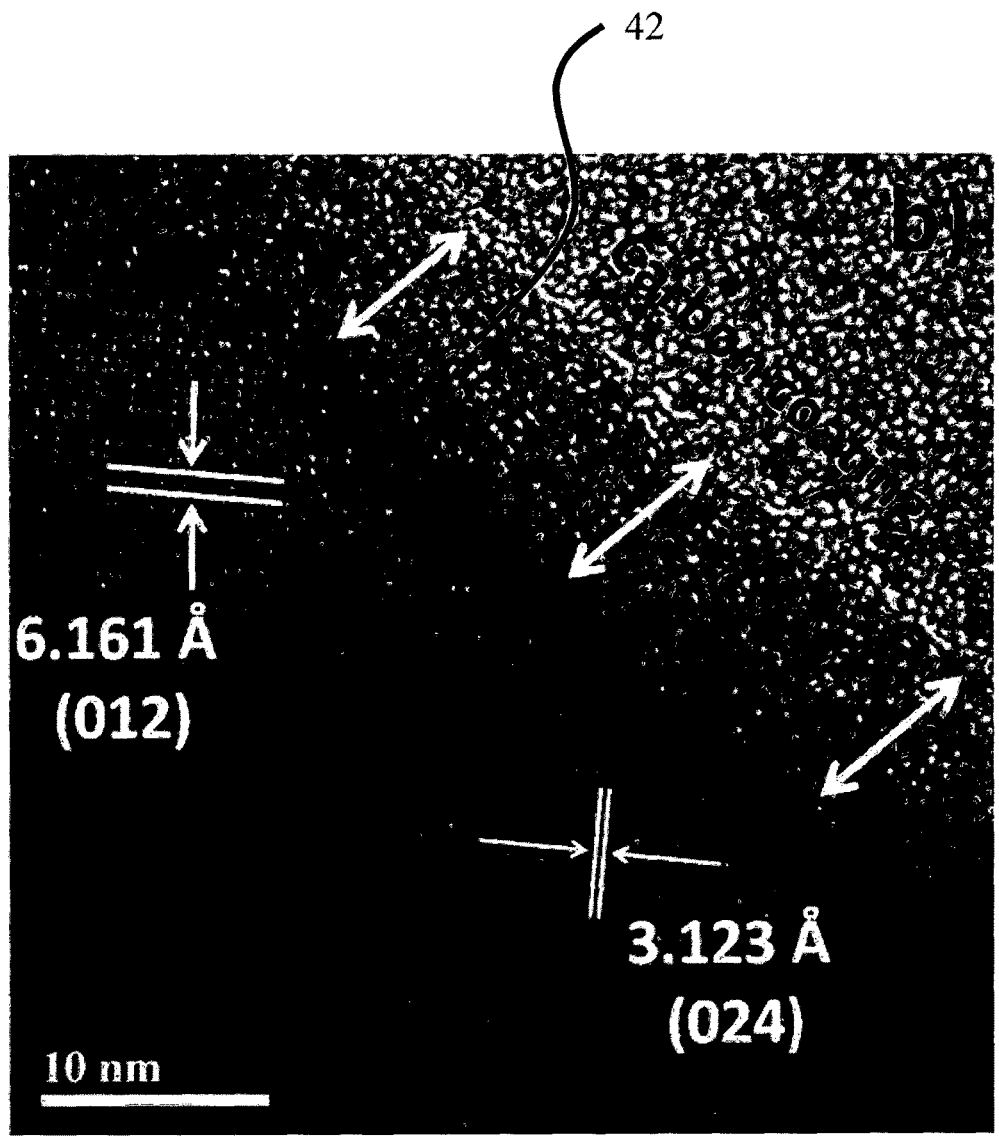
FIG. 4B is an enlarged view of FIG. 4A.
Figure 4C:
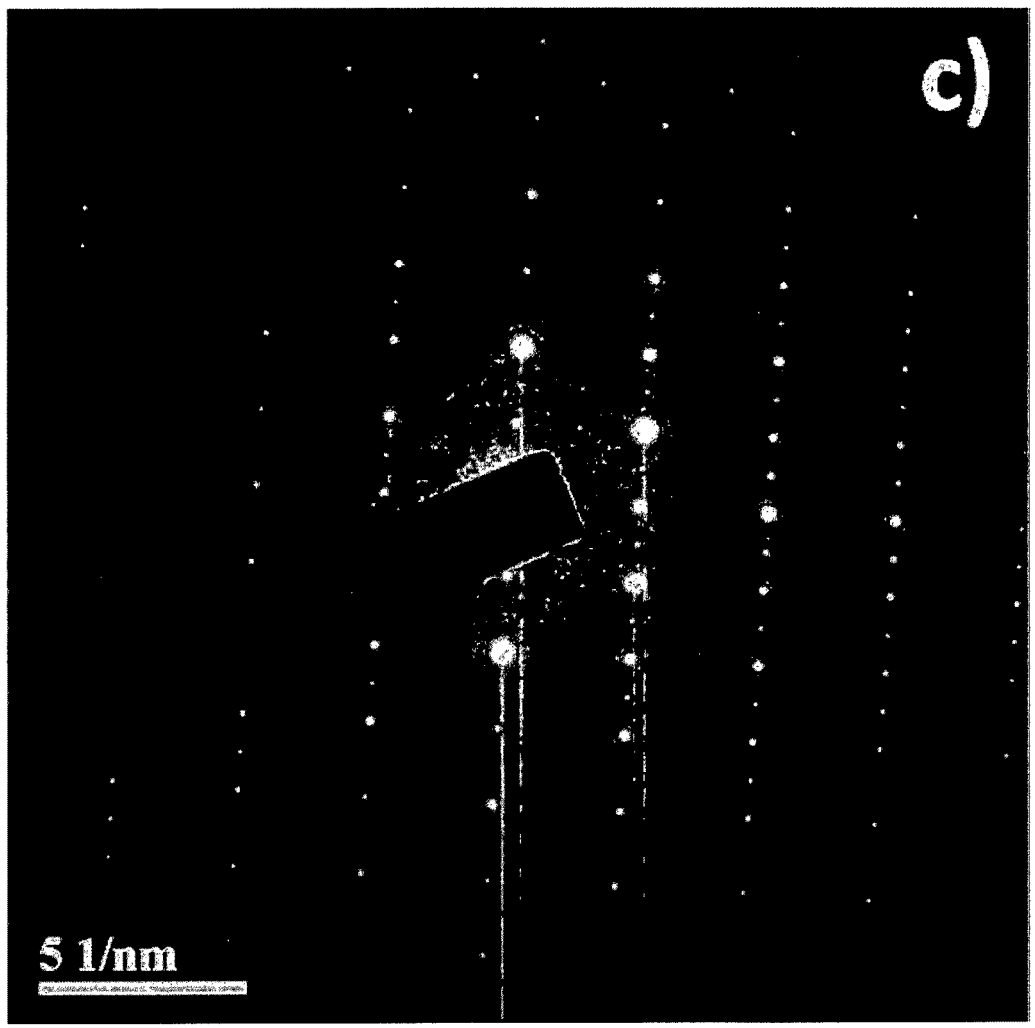
FIG. 4C is an image of SAED pattern showing single crystalline nature of mesoporous $Na_3V_2(PO_4)_3/C$ particles.

FIGS. 4A and 4B show clear lattice fringes of NVP particle with a uniform carbon layer 42 of about 8 nm formed on NVP particle 44. A selected area electron diffraction (SAED) pattern (FIG. 4C) shows single crystalline nature of the NVP nanoparticles which is consistent with the PXRD pattern shown in FIG. 2.

Figure 5:
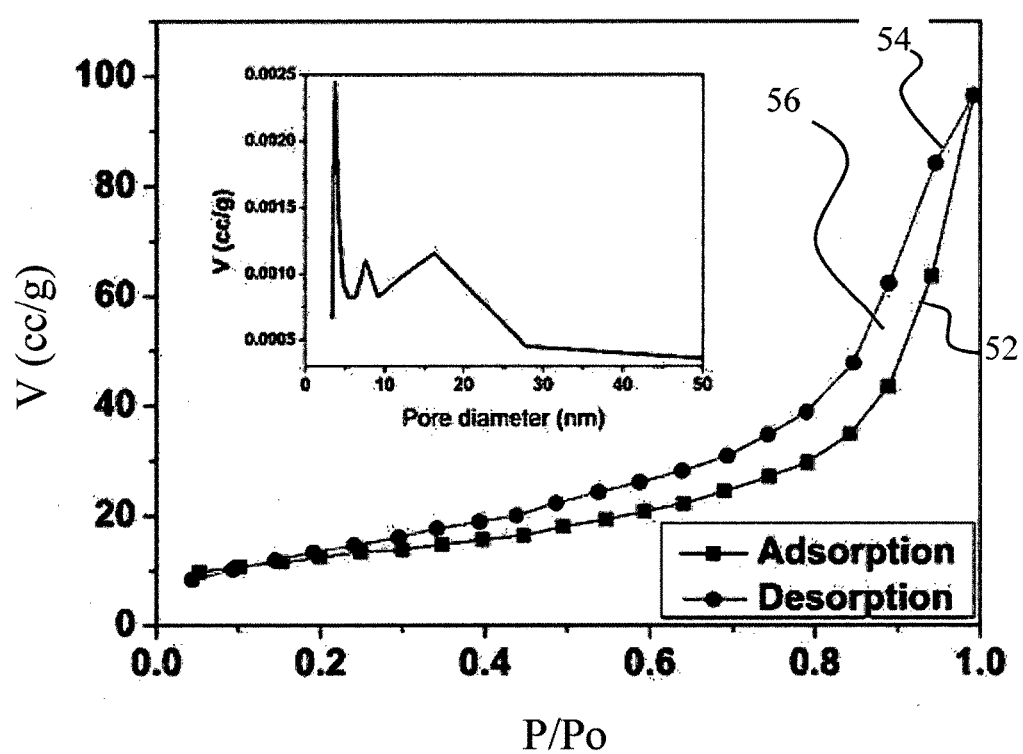
FIG. 5 is a chart showing $N_2$ absorption/desorption isotherms of a $Na_3V_2(PO_4)_3/C$ sample.

Nitrogen absorption/desorption isotherms 52, 54 shown in FIG. 5 indicate that the nanostructured NVP/C prepared according to embodiments of the present disclosure exhibits a distinct large hysteresis loop 56 and this type of behavior is a typical characteristic of mesoporous materials, namely a type-TV isotherm due to capillary condensation in the mesoporous channels and/or cages.

FIGS. 6A, 6B, 7A and 7B show test results of electrochemical behaviour study of an NVP/C material synthesized according to embodiment of the present disclosure. The NVP/C material may be used as either a cathode or an anode for sodium ion battery.

Figure 6A:
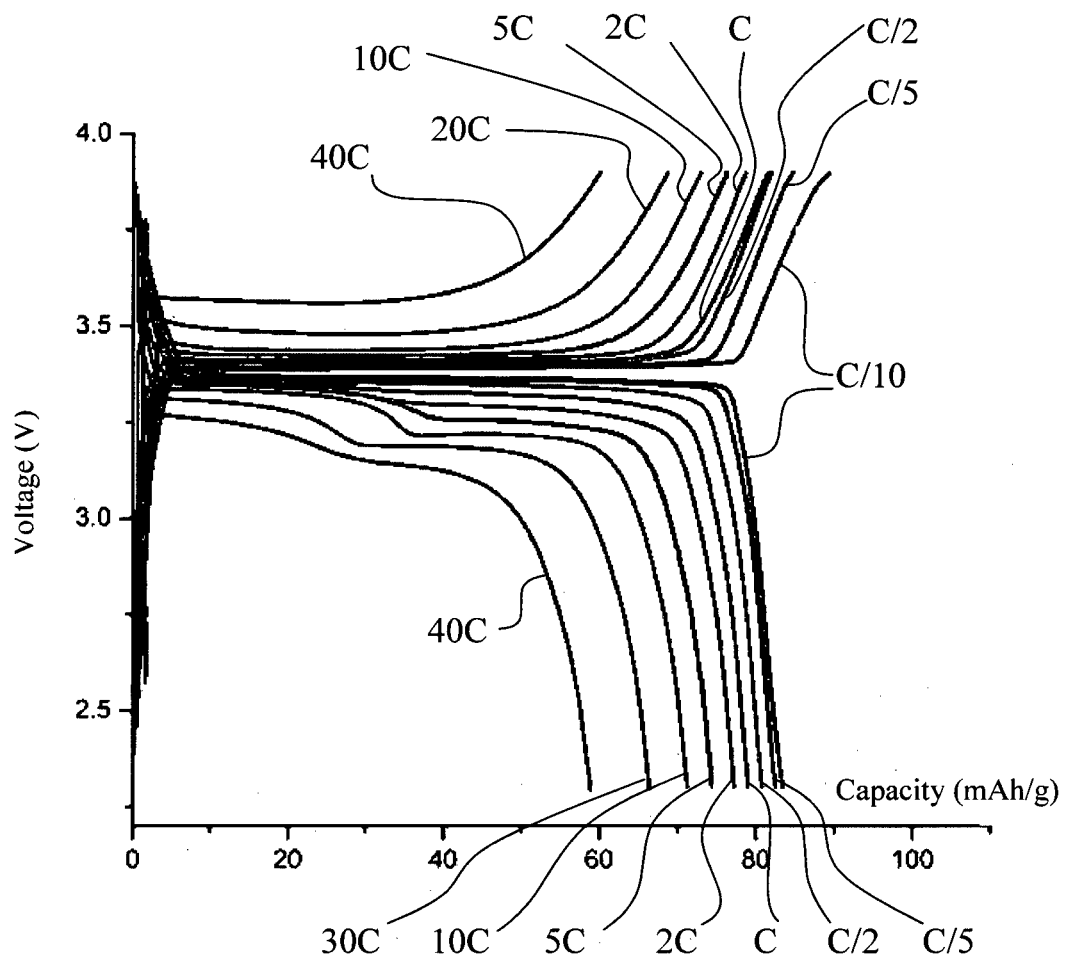
FIG. 6A is a chart showing galvanostatic charge/discharge cycle curves of $Na_3V_2(PO_4)_3/C$ material used as cathode under different current rates.
Figure 6B:
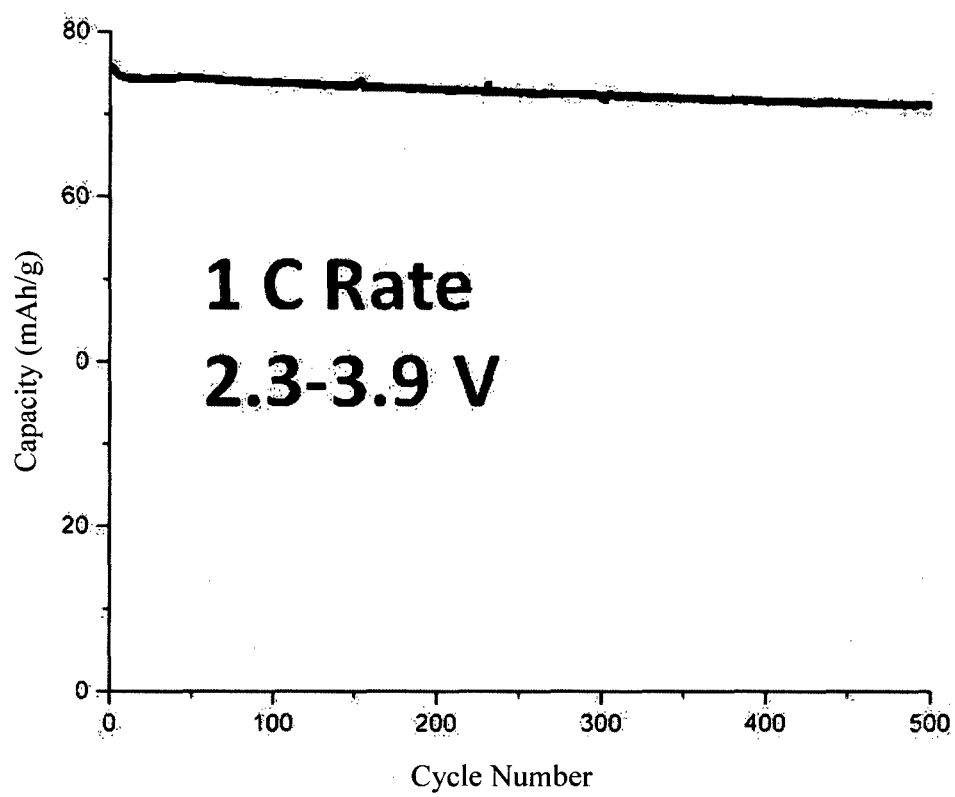
FIG. 6B is a chart showing long term cyclability curve of $Na_3V_2(PO_4)_3/C$ material used as cathode at 1C.

Galvanostatic cycling curves obtained under current density of 117 mAg$^{-1}$ from C/10 to 40C, for porous NVP/C material as a cathode in a Na-ion battery is shown in FIG. 6A. Here 1C refers to a capacity of 117 mAg$^{-1}$ in one hour. As shown, the voltage profile has a flat charge plateau at about 3.39V before it rises steeply to the cutoff voltage of 3.9V, with a direct voltage drop to 3.36V followed by a very flat voltage plateau that spreads over a long range of sodium composition (up to 1.88 mole of Na$^+$) and then falls steeply to the cutoff voltage of 2.3V, leading to the storage capacity of 117 mAhg$^{-1}$. Accordingly, the flat voltage profile for a wide range of sodium ion molar concentrations observed for the NVP/C material synthesized according to embodiment of the present disclosure is much higher than conventional electrode material used for the same applications. During subsequent cycles, the observed voltage profiles remain unaltered, demonstrating excellent reversibility of the cycling process. As shown in FIG. 6B, at 1C rate the capacity can remain around 70 mAhg$^{-1}$ for at least 500 cycles.

Figure 7A:
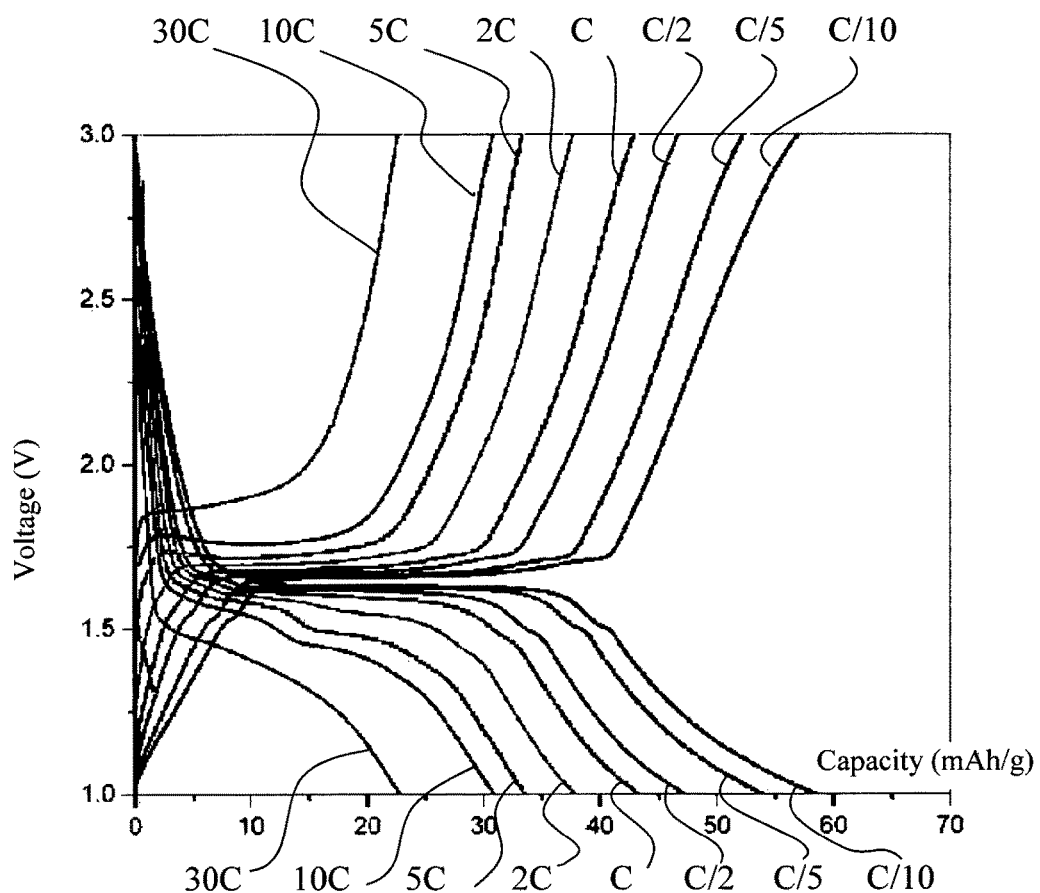
FIG. 7A is a chart showing galvanostatic charge/discharge cycle curves of $Na_3V_2(PO_4)_3/C$ material used as anode under different current rates.
Figure 7B:
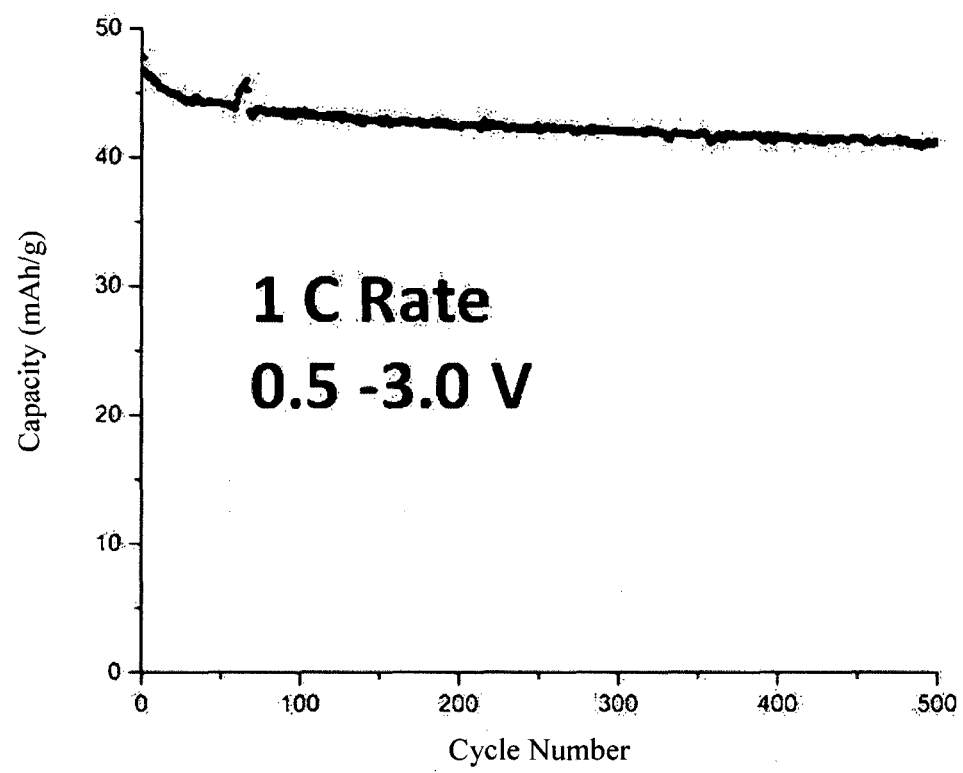
FIG. 7B is a chart showing long term cyclability curve of Na$_3$V$_2$(PO$_4$)$_3$/C material used as anode at 1C.

When an NVP/C material synthesized according to embodiment of the present disclosure is used as an anode in a sodium-ion battery, as shown in FIGS. 7A and 7B. A flat voltage profile was observed during the different charge/discharge current rates. Excellent long term cyclability was also observed when employed as anode.

As illustrated above, with respect to specific but non-limiting sample of NVP/C, an electrode material has Nasicon-type, phosphate framework nanoparticles integrated with carbon matrix between the particles.

Although embodiments of the present disclosure have been illustrated in conjunction with the accompanying drawings and described in the foregoing detailed description, it should be appreciated that the present disclosure is not limited to the embodiments disclosed. Therefore, the present disclosure should be understood to be capable of numerous rearrangements, modifications, alternatives and substitutions without departing from the spirit of the disclosure as set forth and recited by the following claims.

The invention claimed is:

1. A method for synthesizing an electrode material, the method comprising:
preparing a precipitate of particles by a step consisting of dissolving a surfactant, a sodium precursor, a phosphate precursor and a transition metal precursor in a solvent to cause reaction of the sodium, phosphate and transition metal precursors to yield the precipitate of particles, wherein the surfactant is attached to the particles;
removing the solvent; and
sintering the precipitate to crystallize the particles,
wherein during sintering the surfactant is decomposed to form a carbon matrix between the crystallized particles;
wherein the crystallized particles and the carbon matrix are integrated to form the electrode material;
wherein the crystallized particles have a grain size between 20 nm and 200 nm; and
wherein the particles include Na$_3$V$_2$(PO$_4$)$_3$.

2. The method of claim 1, wherein the surfactant is selected from the group consisting of sodium dodecyl sulfate (SDS), octyltrimethyl ammonium bromide (OTAB), dodecyltrimethyl ammonium bromide (DOTAB), cetyltrimethyl ammonium bromide (CTAB), and gluconic acid lactone.

3. The method of claim 1, wherein the sodium precursor is a sodium salt.

4. The method of claim 1, wherein the phosphate precursor is an ammonium phosphate salt or a phosphoric acid.

5. The method of claim 1, wherein the solvent is one of alcohol and a mixture of de-ionized water and alcohol.

6. The method of claim 1, wherein the transitional metal precursor is selected from a metal acetate, metal nitrate, metal chloride, metal acetyl acetonate, metal hydroxide, and combinations thereof.

7. The method of claim 1, wherein the carbon matrix forms a carbon layer coated on the crystallized particles, and wherein the carbon layer has a thickness of 2 to 10 nm.

8. The method of claim 1, wherein removing the solvent consists of drying the precipitate.

9. The method of claim 1, wherein sintering is carried out in one of a flowing oxidizing atmosphere, an inert atmosphere and a reducing atmosphere.

10. The method of claim 1, wherein removing the solvent consists of separating the precipitate from the solvent.

11. A method for synthesizing an electrode material, the method comprising:
preparing a precipitate of particles by a step consisting of dissolving a surfactant, a sodium precursor, a phosphate precursor, a transition metal precursor, and a compound having fluorine in a solvent to cause reaction of the sodium, phosphate and transition metal precursors to yield the precipitate of particles, wherein the surfactant is attached to the particles;
removing the solvent; and
sintering the precipitate to crystallize the particles,
wherein during sintering the surfactant is decomposed to form a carbon matrix between the crystallized particles;
wherein the crystallized particles and the carbon matrix are integrated to form the electrode material;
wherein the crystallized particles have a grain size between 20 nm and 200 nm; and
wherein the particles include Na$_3$V$_2$(PO$_4$)$_2$F$_3$ and NaVPO$_4$F.

12. A method for synthesizing an electrode material, the method comprising:
preparing a precipitate of particles by a step consisting of dissolving a surfactant, a sodium precursor, a phosphate precursor, a transition metal precursor, and a compound having manganese in a solvent to cause reaction of the sodium, phosphate and transition metal precursors to yield the precipitate of particles, wherein the surfactant is attached to the particles;

removing the solvent; and sintering the precipitate to crystallize the particles, wherein during sintering the surfactant is decomposed to form a carbon matrix between the crystallized particles;

wherein the crystallized particles and the carbon matrix are integrated to form the electrode material;

wherein the crystallized particles have a grain size between 20 nm and 200 nm; and wherein the particles include $Na_2V_{0.5}Mn_{0.5}PO_4F$.

* * * * *